United States Patent
Yuang

(10) Patent No.: US 7,290,946 B2
(45) Date of Patent: Nov. 6, 2007

(54) OPTICAL SUBASSEMBLY

(75) Inventor: Rong-Heng Yuang, Hsinchu (TW)

(73) Assignee: Cortek Opto Corp., Hsinchu (TW)

( * ) Notice: Subject to any disclaimer, the term of this patent is extended or adjusted under 35 U.S.C. 154(b) by 0 days.

(21) Appl. No.: 11/502,966

(22) Filed: Aug. 9, 2006

(65) Prior Publication Data

US 2006/0275000 A1    Dec. 7, 2006

Related U.S. Application Data

(63) Continuation-in-part of application No. 11/078,835, filed on Mar. 11, 2005, now abandoned.

(51) Int. Cl.
*G02B 6/36* (2006.01)
(52) U.S. Cl. .................................... 385/93
(58) Field of Classification Search ............ 385/88–94
See application file for complete search history.

(56) References Cited

U.S. PATENT DOCUMENTS 6,283,644 B1 * 9/2001 Gilliland et al. ............. 385/93
2002/0181903 A1 * 12/2002 Kuhn et al. .................. 385/93
2005/0018981 A1 * 1/2005 Modavis et al. ............. 385/93

* cited by examiner

*Primary Examiner*—Sarah Song
(74) *Attorney, Agent, or Firm*—Charles E. Baxley

(57) ABSTRACT

An optical sub-assembly module includes a receptacle combined with a light emitting device. The receptacle includes an optical axis, a coupling structure is aligned with the optical axis. The light emitting device includes a outer seal and a light emitting chip disposed in the outer seal. An open aperture is formed in the surface of the outer seal and opposite to the light emitting chip, and a transparent surface of the light emitting chip is a flat structure without lens. Therefore, the light beam emitted from the light emitting chip does not pass through any micro lens, and the light beam between the light emitting chip and the coupling structure is not refracted.

14 Claims, 17 Drawing Sheets

OPTICAL SUBASSEMBLY

CROSS-REFERENCES TO RELATED APPLICATIONS

The present invention is a continuation-in-part application of the co-pending U.S. Ser. No. 11/078,835, filed on Mar. 11, 2005 now abandoned.

BACKGROUND OF THE INVENTION

1. Field of the Invention

The present invention relates to an optical subassembly, and more particularly to a combination of a semiconductor light emitting device and a plastic receptacle. The optical subassembly is used in the field of fiber optic communication, and the receptacle is combined with a fiber ferrule.

2. Description of the Prior Arts

Fiber optic communication is to transform the electrical signals emitted from the emitting end into optical signals, and then the optical signals are guided into an optical fiber and transmitted to the receiving end, after that the optical signals are transformed into electrical signals again. The emission and reception of the optical signals should be achieved by optical subassembly. For communication products, the quality requirement of the components is pretty high. The components need to be sealed with the method of hermetic sealing method, so as to prevent their operation from being damaged by outer atmospheric surrounding.

A conventional optical subassembly contains at least a diode on a header, a lens or a system of lenses, and a precise mechanical port for docking a fiber/ferrule assembly. It generally includes a receptacle and a light emitting/receiving optoelectronic device, wherein the receptacle is defined with a passage for insertion of a fiber ferrule. The light emitting/receiving device is employed to generate/receive optical signals. Namely, the optical subassembly in the system is also called the coupling unit. It can be concluded that an optical subassembly plays an important role in the optical communication. The optical power and light coupling efficiency provided by the optical subassembly decide the quality of signal transmission through a fiber. To improve the optical power and light coupling efficiency, the optical subassembly should be equipped with or formed with an optical beam transformation system, e.g., lenses, or it should be equipped with the light emitting device that can provide high output power.

Referring to FIG. 1, wherein an optical subassembly 10 includes a light emitting device 11 (ball-lens To-can) and a receptacle 12. The light emitting device 11 refers to laser diode or light emitting diode, and the receptacle 12 is made by plastic injection molding, along the axis of which is defined with a through passage 17 and an optical axis 18. The light emitting device 11 is combined with the receptacle 12 and an end of an optical fiber 13 is inserted in the passage 17 of the receptacle 12 and located opposite to the light emitting device 11. By such arrangements, after optical signals are emitted from the light emitting device 11, the optical signals can enter in the optical fiber 13. However, due to the divergence angle of the light emitted from the light emitting device 11, the light is unable to directly and totally enter in the optical fiber 13. In this case, a lens 14 can be disposed between the receptacle 12 and the light emitting device 11 in order to gather the light emitted by the light emitting device and guide it into the optical fiber 13. The lens 14 can be a spherical lens and disposed in alignment with the light emitting chip 16 on the top cap 15 of the light emitting device 11.

Since the spherical lens 14 is disposed on the top cap 15, there is assembly tolerance between the lens 14 and the light emitting chip 16, and it also has assembly tolerance when the light emitting device is assembled to the receptacle 12, thereby it is susceptible to the deviation of the lens 14 from the optical axis 18 of the receptacle 12, and some optical signals cannot be conducted to the optical fiber 13 by the lens 14. Moreover, the light coupling efficiency of the spherical lens 14 is low, thereby the operation of the optical subassembly 10 doesn't reach the optimum level. As concerns the light emitting device 11, the top cap 15 of which should be defined with a spherical lens 14, thus the cost is increased.

Referring to FIG. 2A, wherein a commonly-used conventional optical subassembly 20 includes a receptacle 22 and a light emitting device 21 (it is called flat-window TO-can). The receptacle 22 is defined with a passage 27 that has a close end. The close end of the passage 27 is defined with a lens 23, and an optical axis 28 is defined in the axial direction of the passage 27. The light emitting device 21 includes a metal cap 24 interiorly provided with a light emitting chip 25, the metal cap 24 is defined with a glass plate 26 on the top surface thereof. By such arrangements, the light emitted from the light emitting chip 25 can penetrate the glass plate 26 and then be gathered by the lens 23.

Since the glass plate 26 on the cap 24 has no light-gathering power, it doesn't matter whether the light emitting chip 25 is aligned to the cap 24 or not, the light emitting chip 25 can be aligned to the optical axis 28 by taking advantage of light coupling when assembling the light emitting device 21 to the receptacle 22, and the lens 23 is formed by plastic injection molding, such that the light coupling efficiency of the aspherical lens is effectively improved. However, since the light emitting device 21 should be equipped with the glass plate 26, the component cost of the optical subassembly 20 is increased.

On the other hand, when the lens 23 is located close to the light emitting chip 25, the light with a large divergence angle emitted by the light emitting chip 25 still can be projected in the scope of the lens 23. However, since the glass plate 26 is disposed on the cap 24 of the light emitting device 21, it limits the approaching distance between the lens 23 and the light emitting chip 25. Although the distance between the lens 23 and the light emitting chip 25 can be shortened by reducing the height of the cap 24, the light emitting device 21 has a certain regular specification as usual. If the height of the metal cap 24 is attributably changed and the quantity of the changed metal cap 24 is not large enough, the component cost of the optical subassembly 20 will also be increased. Vice versa, the light emitting chip 25 can be moved to be close to the lens 23 by increasing the height of the light emitting chip 25, but the production cost will be increased again.

The U.S. Pat. No. 5,973,862 discloses an optical subassembly, wherein the receptacle is provided with plural grip fingers for holding the spherical lens, however, it is unable to reduce the cost since the light emitting device is still provided with glass. On the other hand, the light coupling efficiency of the spherical lens is low, and the distance between the spherical lens and the light emitting chip in the light emitting device can not be shortened any more.

The U.S. Pat. No. 6,547,455 also discloses an optical subassembly, which uses a dual-lens device to increase the light coupling. However, since the light emitting device is provided with glass, the cost is relatively high, and the lens is unable to move closer to the light emitting chip in the light emitting device. Furthermore, installing the dual glass lens in the receptacle brings the possible shifting of the optical axial position, so that it may cause the misalignment with the light emitting device or the fiber. As a result, the structure with the dual lens in the receptacle is adverse to the light coupling effect.

The U.S. Pat. No. 6,283,644 discloses an optical subassembly, which has a dual-lens structure in a receptacle to increase the light coupling. However, the embodiment of the patent allows for passive alignment of the optical package, the coupling efficiency is adverseness.

The US 2005/0018981 A1 discloses an optical subassembly, which has a single lens in a receptacle, and the light emitting device is a TO-can with a glass. Thus, the cost of the light emitting device is expensive, and the lens fails to close to the chip which is disposed in the light emitting device.

The operation speed of the conventional optical subassembly of a LED module can reach 155 Mb/s at least, which can satisfy the requirement for the general users in local area network. The LED optical subassembly has the advantage of low cost in case of a large quantity of user terminals. However, the divergence angle of the LED device is rather large, only a lens is not enough to focus the light. In this case, the LED optical subassembly should be additionally equipped with a lens or lenses structure so as to improve the coupling effect. With reference to FIG. 2B, wherein the LED chip 110 includes an epitaxial portion 112 that is made of plural layers of semiconductor materials, including an active layer 114 that can generate light output by current injection. The epitaxial portion 112 is grown on a substrate 116, and the substrate 116 is provided with a monolithically integral micro lens 118. Since the substrate is almost transparent, the light emitted from the active region 114 will pass through the substrate and then to be focused by the micro lens 118, and thus the light coupling efficiency is accordingly improved.

However, to etch a micro lens 118 on the substrate 116, it should precisely control the etching uniformity on the whole wafer. In fact, the process is not easy to be controlled in production. As a result, the production cost is relatively increased. Furthermore, if the substrate 116 is thick, it will affect the light-gathered efficiency due to the light divergence. The substrate 116 has to be lapped to a desired thickness in order to improve the light-gathered efficiency. The thin substrate 116 is thus susceptible to be broken into pieces, leading to a reduced process yield.

On the other hand, since the light is emitted via the substrate 116, that is to say that the light is emitted from the backside of the chip, the on-wafer auto testing for the chips is difficult. The latter process is not easy to be controlled. Moreover, when passing through the chip 110, the light is initially focused by the micro lens 118 and then refocused by the lens of the receptacle. If the misalignment of the optical axis happens during the chip process, for example, if an error is appeared when making and aligning the micro lens on the substrate, the light coupling efficiency is drastically decreased. The transmitter optical subassembly comprised of the LED and the receptacle thus fails to meet the requirement of the specification and cannot be qualified for applications. The assembly of the monolithic integral lens of the LED and the single lens of package element can be provided enough output power in the conventional LED optical subassembly. But there are still some problems needed to be solved, such as manufacture inconvenience, high production cost, and power degradation by misalignment, and incompatibility with on-wafer testing, as mentioned above.

The present invention has arisen to mitigate and/or obviate the afore-described disadvantages of the conventional optical subassembly.

SUMMARY OF THE INVENTION

To overcome the disadvantages of the above-mentioned optical subassemblies, there is provided an improved optical subassembly in accordance with the present invention.

The objective of the present invention is to provide an optical subassembly module comprising a light emitting device and a receptacle. The receptacle has a dual-lens structure that forms a single unit together with the receptacle to collect the light emitted from the light emitting device more effectively and ensure a better light coupling efficiency with the light emitting device.

The secondary object of the present invention is to provide an optical subassembly, which includes a receptacle and a light emitting device, wherein the light emitting device provided with a light emitting chip in an outer seal. An end of the outer seal is open structured and located opposite to the light emitting chip. Such arrangements can substantially reduce the production cost of the light emitting device.

The other object of the present invention is to provide an optical subassembly that includes a receptacle and a light emitting device, wherein the receptacle is provided with a lens, and an outer seal of the light emitting device is interiorly provided with a light emitting chip. The lens can enter the outer seal so as to be located close to the light emitting chip, such that more optical signals emitted from the light emitting device can be focused by the lens.

Another advantage of the present invention is that the optical subassembly is not provided with glass plate piece, which has no problem of light reflection, thereby, the light coupling efficiency is increased.

The above-mentioned light emitting device refers to the light emitting device with metal seal, such as TO-CAN or LED sealed with epoxy resin. The components of the optical subassembly is fully compatible with conventional manufacturing infrastructure. The advantages lead to good performance, easy fabrication, high yield, and low cost simultaneously all together for mass production, that is beneficial for wide applications.

The present invention will become more obvious from the following description when taken in connection with the accompanying drawings, which shows, for purpose of illustrations only, the preferred embodiments in accordance with the present invention.

DETAILED DESCRIPTION OF THE INVENTION

Figure 1:
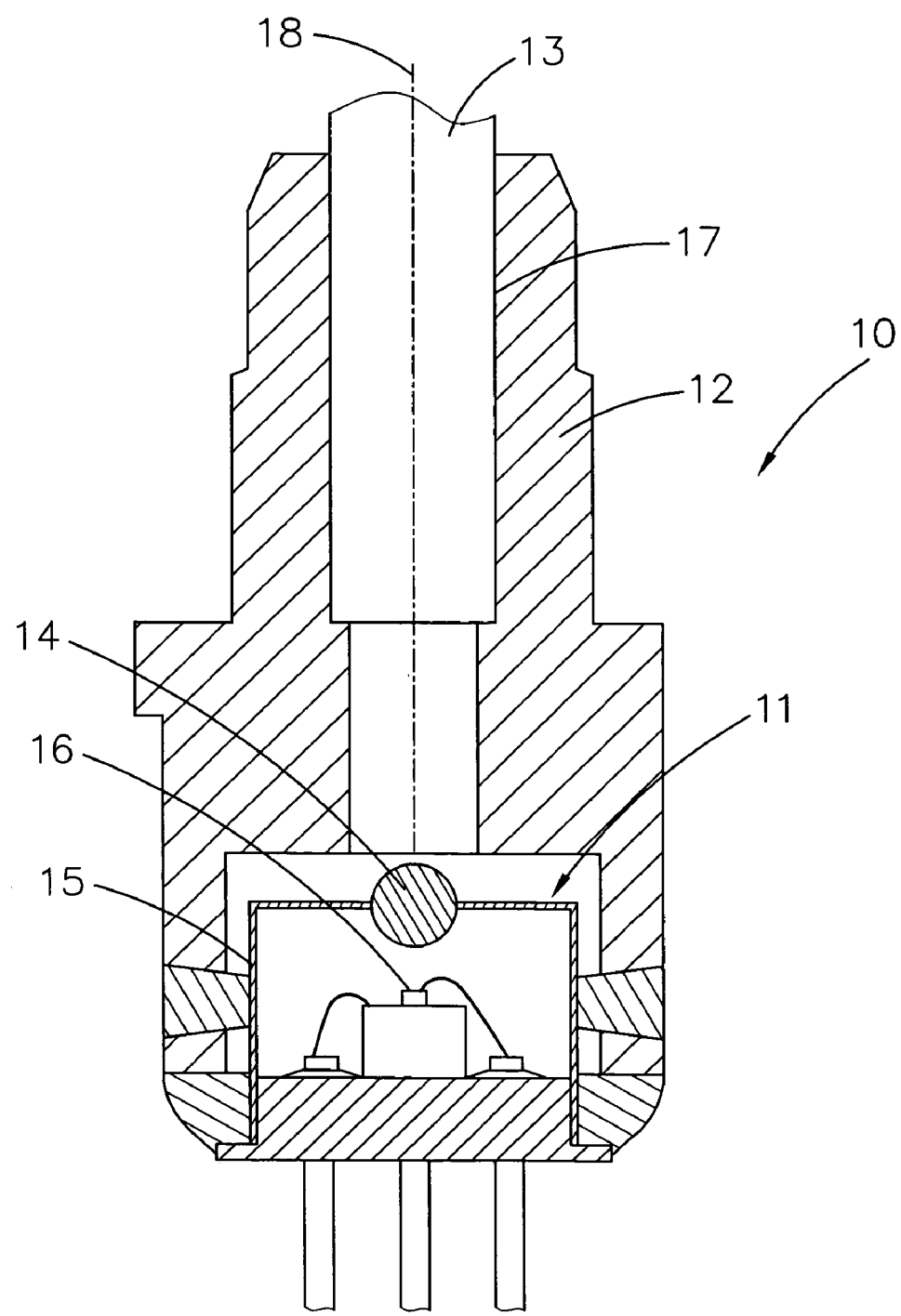
FIG. 1 is a cross sectional view of a conventional optical subassembly.
Figure 2A:
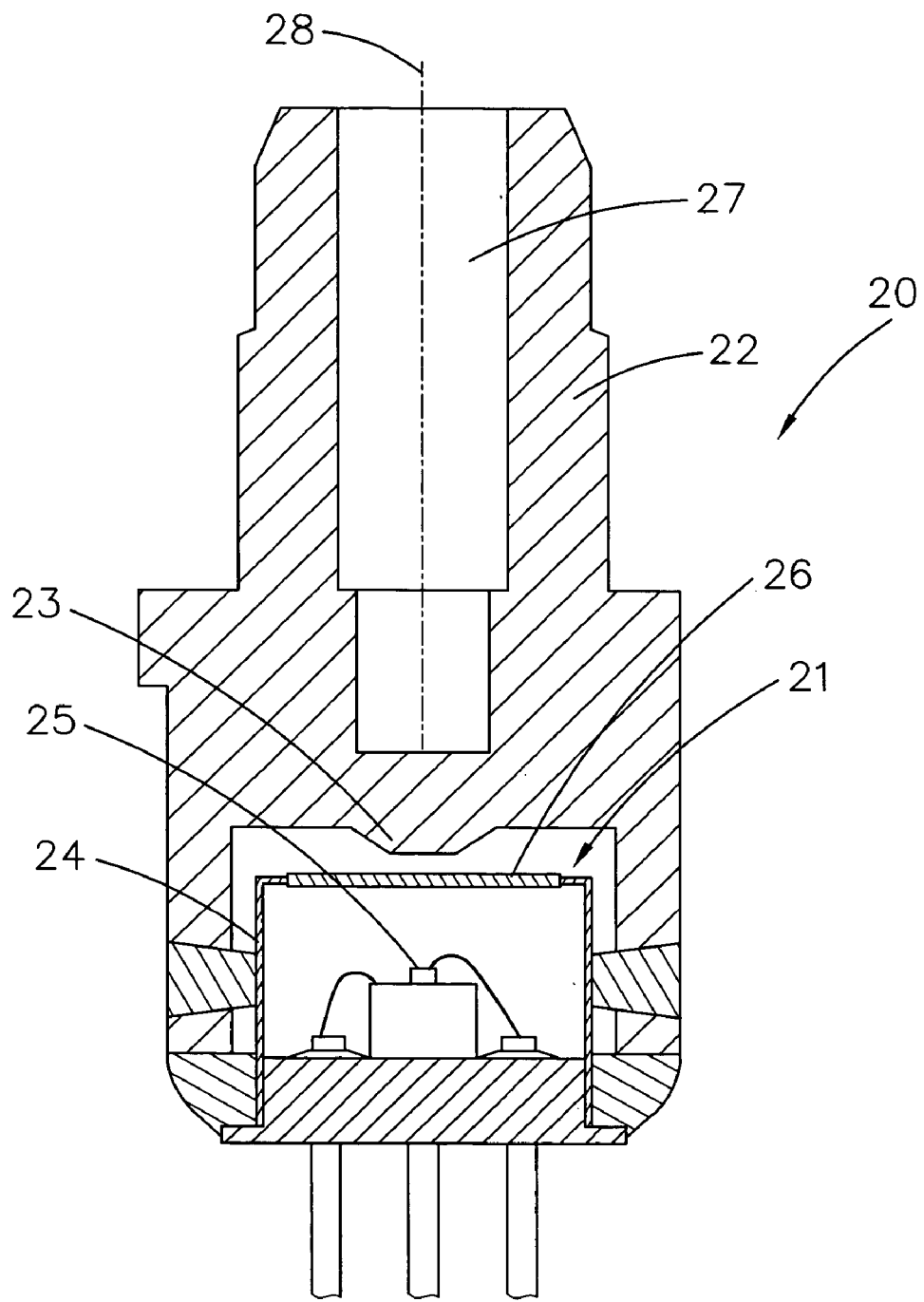
FIG. 2A is a cross sectional view of another conventional optical subassembly.
Figure 2B:
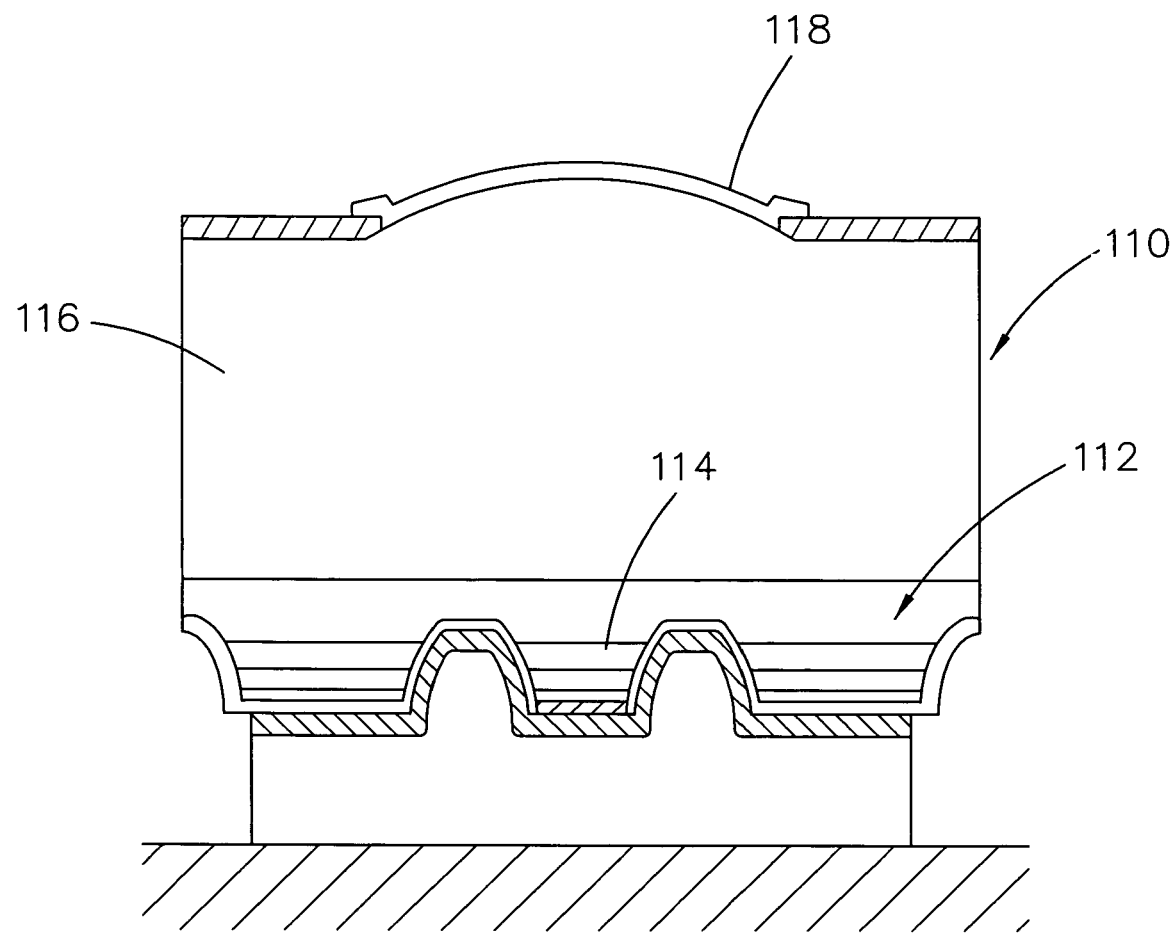
FIG. 2B is a partial structural view of a conventional light-emitting chip.
Figure 3A:
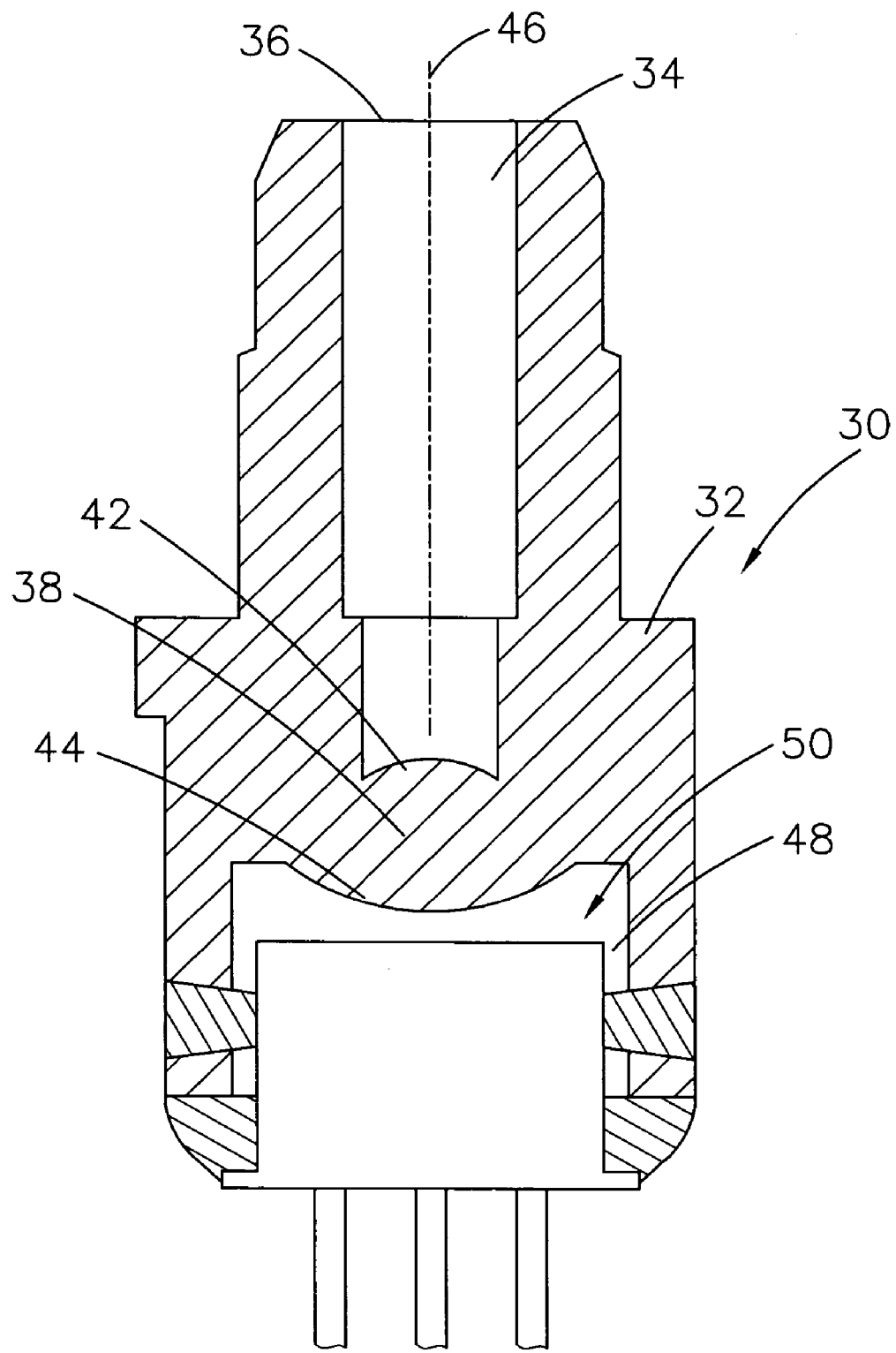
FIG. 3A is a schematic view of an optical sub-assembly module comprising a traditional light emitting device and a receptacle with a dual-lens structure.

Referring to FIG. 3A, the optical subassembly module 30 comprises a light emitting/receiving device 50. The light emitting/receiving device 50 is either a traditional LED, a laser diode, a light emitting component with a TO-CAN structure of metal shell or glass, or a photo detector.

Figure 3B:
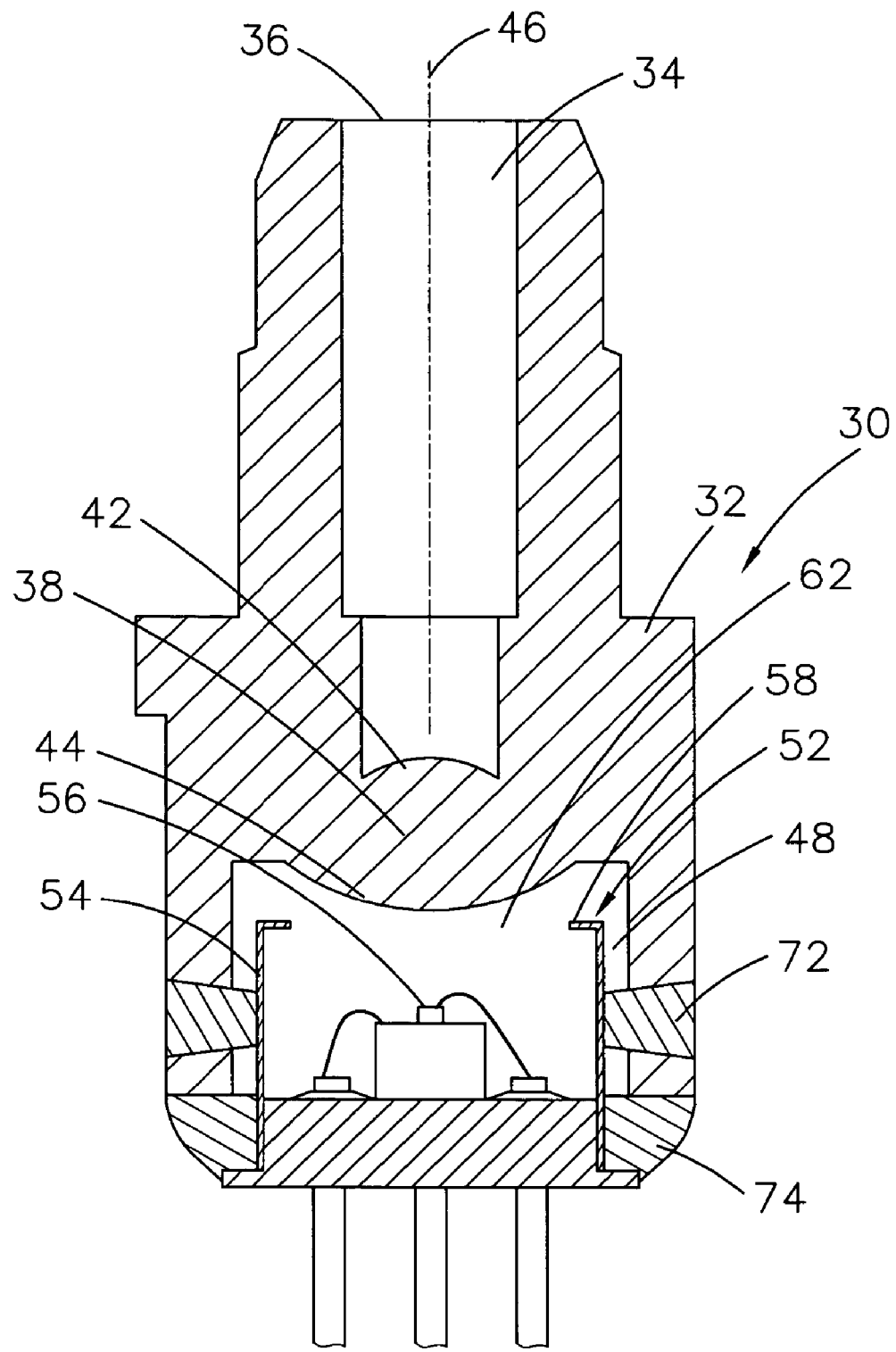
FIG. 3B is a cross sectional view of an optical subassembly in accordance with the present invention.

Referring to FIG. 3B, wherein an optical subassembly 30 in accordance with the present invention is shown and generally comprises: a plastic receptacle 32 and a light emitting device 52, and the plastic receptacle 32 is assembled with the light emitting device 52.

The receptacle 32 can be in form of the SC, ST, LC and the likes, taking ST receptacle as an example, wherein the receptacle 32 is defined with a passage 34 which has an open end 36 and a close end 38. The close end 38 as least is provided with a lens, both opposite surfaces of the close end 38 are defined with lenses 42 and 44 respectively. An optical axis 46 in alignment with the lenses 42, 44 defined in the passage 34 along the axial direction thereof. It is easy to form the opposite lenses 42, 44 in alignment with the optical axis 46 on the receptacle 32 due to the technology of plastic injection molding is highly developed. Furthermore, at the end of the receptacle 32 opposite the passage 34 is provided with a chamber 48, and the lens 44 corresponds to the chamber 48. The lens 44 with a larger diameter is more efficient in light gathering.

The lens 42, 44 is formed directly inside the receptacle 32, so no shifting occurs to the relative position between the lens structure and the receptacle 32. As a result, correct light coupling is assured by the combination of the receptacle 32 and the light emitting device 52.

Furthermore, the light emitting device 52 includes an outer seal 54 and a light emitting chip 56. The outer seal 54 can be made of metal, an end 58 of which is defined with a through aperture 62. The light emitting chip 56 is received in the outer seal 54 and disposed in alignment with the aperture 62. It is worthy to note that the aperture 62 in the outer seal 54 is open structured without being covered by any object.

During the sealing process, the light emitting device 52 is disposed in the chamber 48 of the receptacle 32, and then via the aperture 62 the light emitting chip 56 is aligned o the optical axis 46 and the focal point thereof using optical coupling techniques, the light emitting device 52 and the receptacle 32 are temporally fixed with adhesive 72 (UV glue), and then permanently fixed with adhesive 74, thus the chamber 48 of the receptacle 32 is closed and the emitting chip 56 is enclosed in the receptacle.

Figure 4:
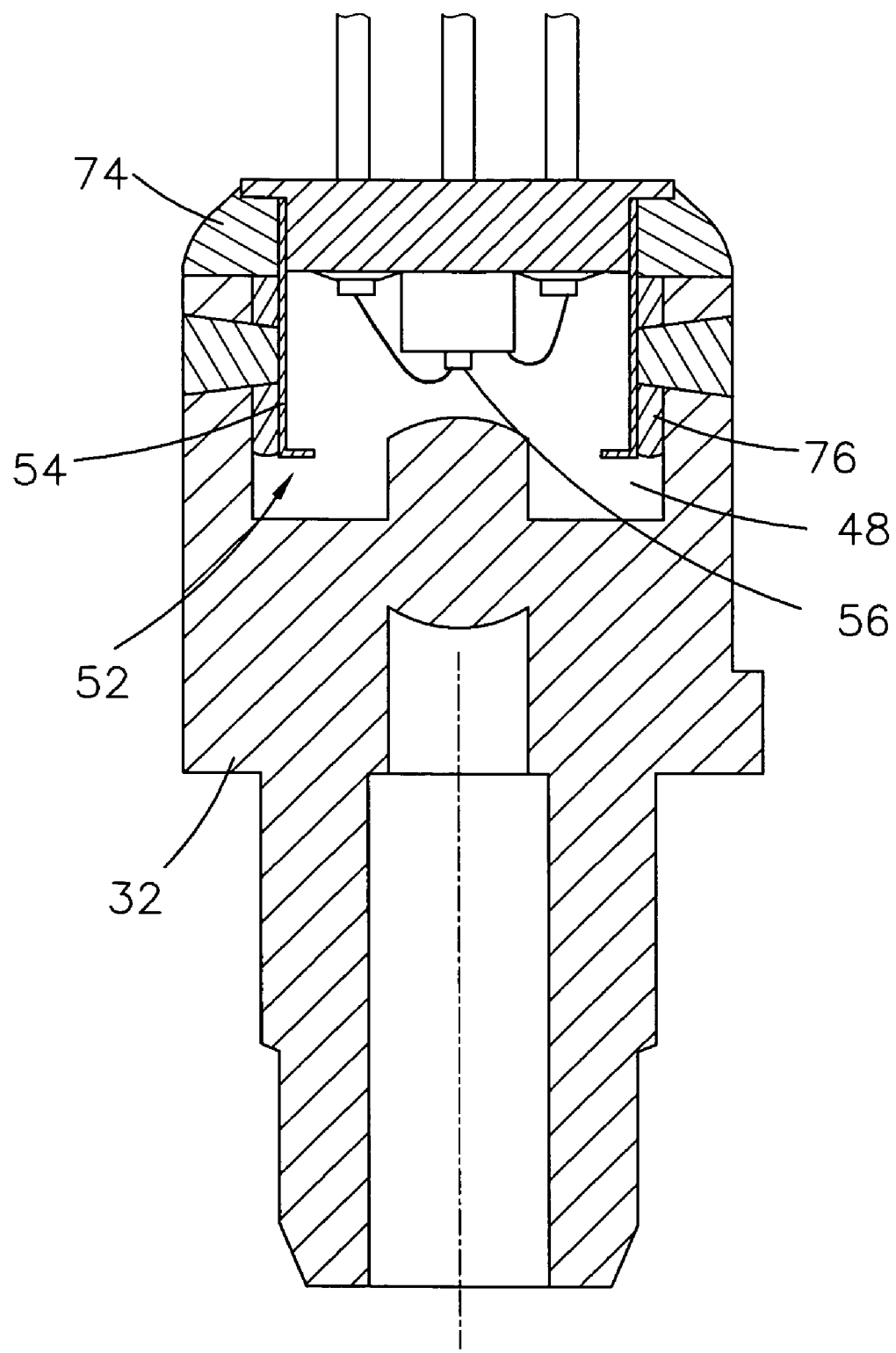
FIG. 4 is another cross sectional view of an optical subassembly in accordance with the present invention, wherein the lens is defined close to the light emitting chip, and the chamber is hermetically sealed.

Referring to FIG. 4, after the temporary fix by the adhesive 72, the adhesive 76 is used to fill up the air gap between the outer seal 54 and the inner wall of the chamber 48 so as to make the light emitting device 52 adhere with the receptacle 32. Due to the low viscosity of the adhesive 76 and the effect of its surface tension, the adhesive 76 will flow beneath the adhesive 72, stay on the periphery of the outer seal 54, and result in a isolated space in the chamber 48. The space condition depends on the gluing process environment at that time, e.g., vacuum or nitrogen ambience. The lens 44 and the light emitting chip 56 will not be contaminated by the adhesive 76 and the light coupling efficiency will not be affected. Finally, they are permanently fixed with the adhesive 74.

Furthermore, according to the above-mentioned structures, the chamber 48 further can be vacuumed or filled with inactive gases, such as nitrogen, so as to keep the light emitting chip 56 from oxidation. In addition, our experimental results showed that the elements could be sealed 100% by this sealing method. However, the conventional sealing method can't meet the requirement if the light emitting device 52 is non-hermetic sealing.

Furthermore, if the sealant of the adhesive 76 is soft, e.g., silicone, the adhesive 74 must be adopted to increase the bonding strength. And, if the bonding strength of the sealant of the adhesive 76 is strong enough, the adhesive 74 and 76 can be the same and even a single glue, for example, UV glue or AB epoxy, can be used to replace the two adhesives 74 and 76.

The specification of the light emitting device 52 in the above-mentioned embodiments is the same as that of the conventional light emitting device. The distinction of the present invention is that the top surface of the light emitting device 52 in the above-mentioned embodiments is not equipped with glass plate or any cover. The present invention rules out the high cost component of the light emitting device 52, thereby, the material cost is substantially reduced.

In addition, the sealing process of the light emitting device 52 and the receptacle 32 is compatible with the conventional methods, thus the process cost will not be increased despite the structure of the light emitting device 52 is changed.

Figure 5:
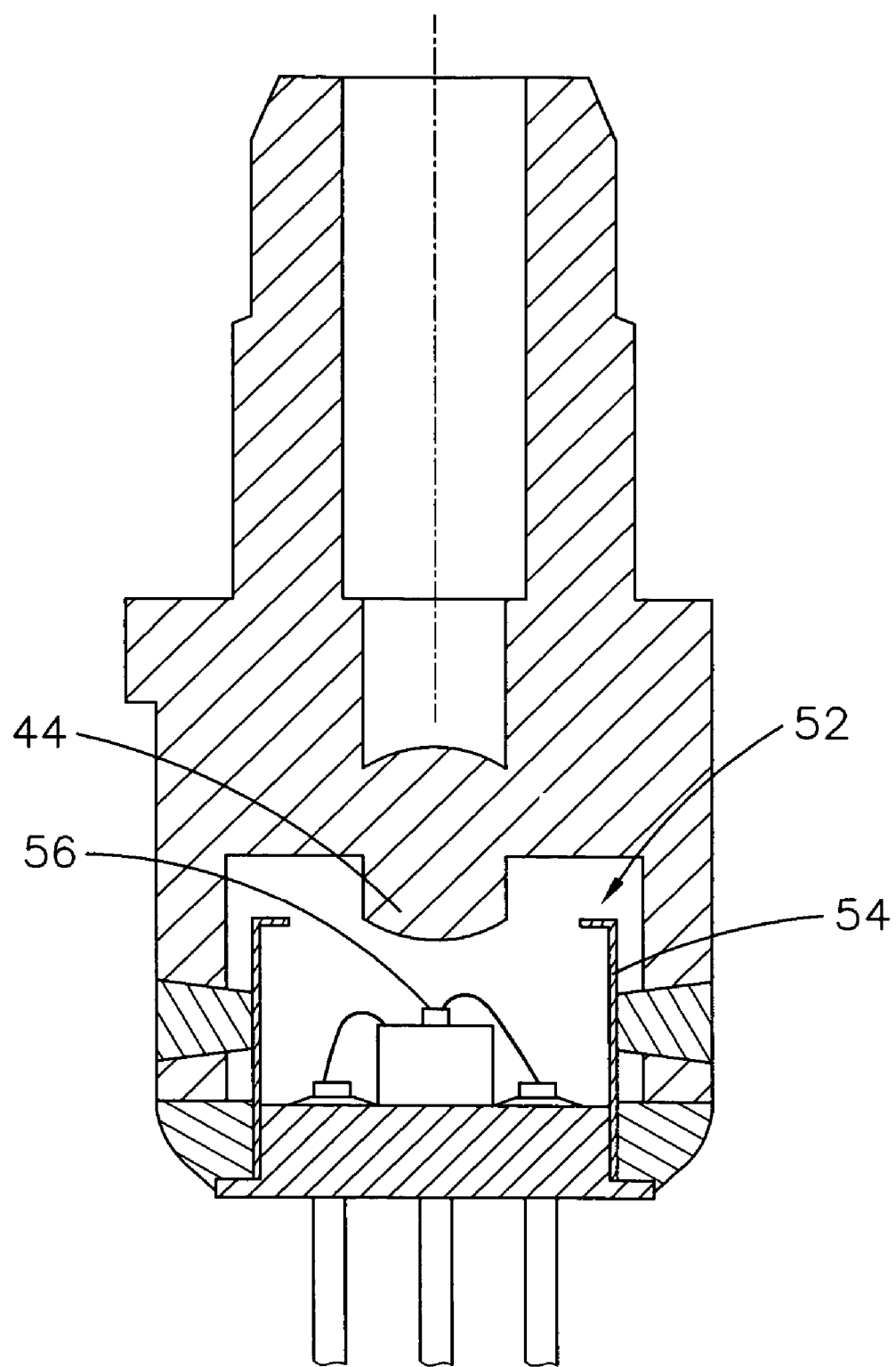
FIG. 5 is another cross sectional view of an optical subassembly in accordance with the present invention for showing the lens defined close to the light emitting chip.

Referring to FIG. 5, since the top surface of the light emitting device 52 has no cover structure, the lens 44 can be made closer to the light emitting chip 56. The lens 44 can be extended even into the outer seal 54, such that the lens 44 and the light emitting chip 56 can be located more closely. In this case, most of the light emitted by the light emitting chip 56 can be projected over the lens 44, especially for a large divergence angle. The light gathered power can thus be substantially improved.

Figure 6:
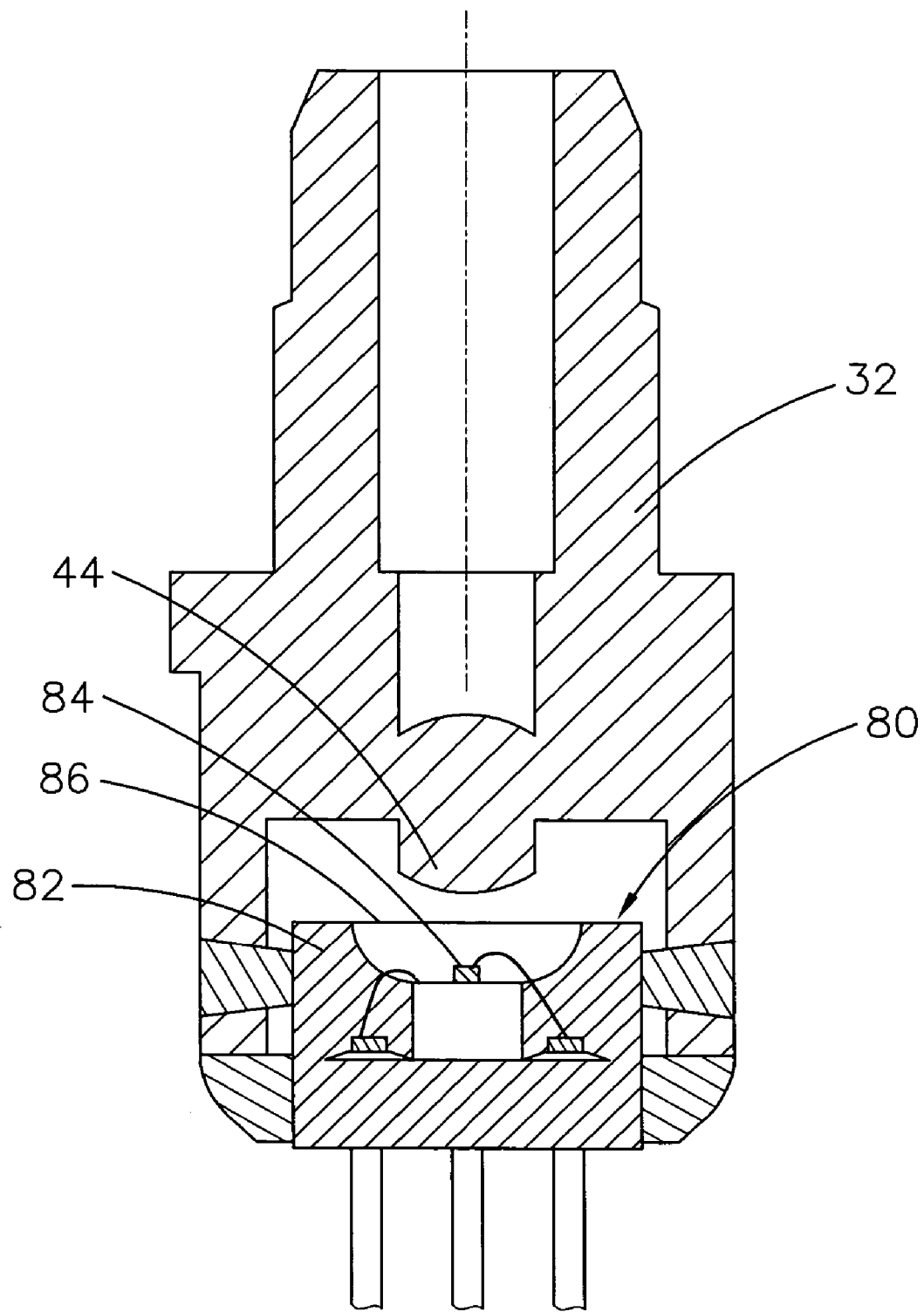
FIG. 6 is another cross sectional view of an optical subassembly in accordance with the present invention, wherein the light emitting device is a surface emitting diode.

Referring to FIG. 6, an optical subassembly in accordance with another embodiment of the present invention includes a receptacle 32 and a light emitting device 80. The structure of the receptacle 32 is the same as that of the above-mentioned embodiment, and the assembly method for the light emitting device 80 and the receptacle 32 is also identical with the above-mentioned embodiment. The outer seal 82 of the light emitting device 80 is a layer of epoxy resin, and a light emitting chip 84 is disposed in the outer seal 82. This is a cost-effective packaging method widely used in the conventional LEDs. It is to be noted that the top surface of the outer seal 82 is defined with an open aperture 86 that is not covered/sealed by any objected.

Taking the light emitting device 80 as an example, although the beam divergence angle of the light emitting device 80 is relatively large, since the top surface of the outer seal 82 of the light emitting diode 80 is open, the lens 44 of the receptacle 32 can be made close to the light emitting chip 84, such that most of the beams can be projected over the lens 44 and the light-gathered power is accordingly improved.

In addition, since the receptacle 32 in accordance with the embodiments of the present invention are provided with two opposite lenses 42, 44. The light emitted by the light emitting devices 80 after two light-gathered processes can be focused into a smaller beam spot so as to be aligned well to an optical fiber, which makes the production easier.

In the above-mentioned embodiments, the light emitting device and receptacle can be in a hermetic seal condition. However, a non-hermetic seal condition may be also used if there is no reliability issue on the light emitting device. If special passivation is applied for the semiconductor device, normal operation can be sustained without any damage in the atmospheric environment.

Figure 7:
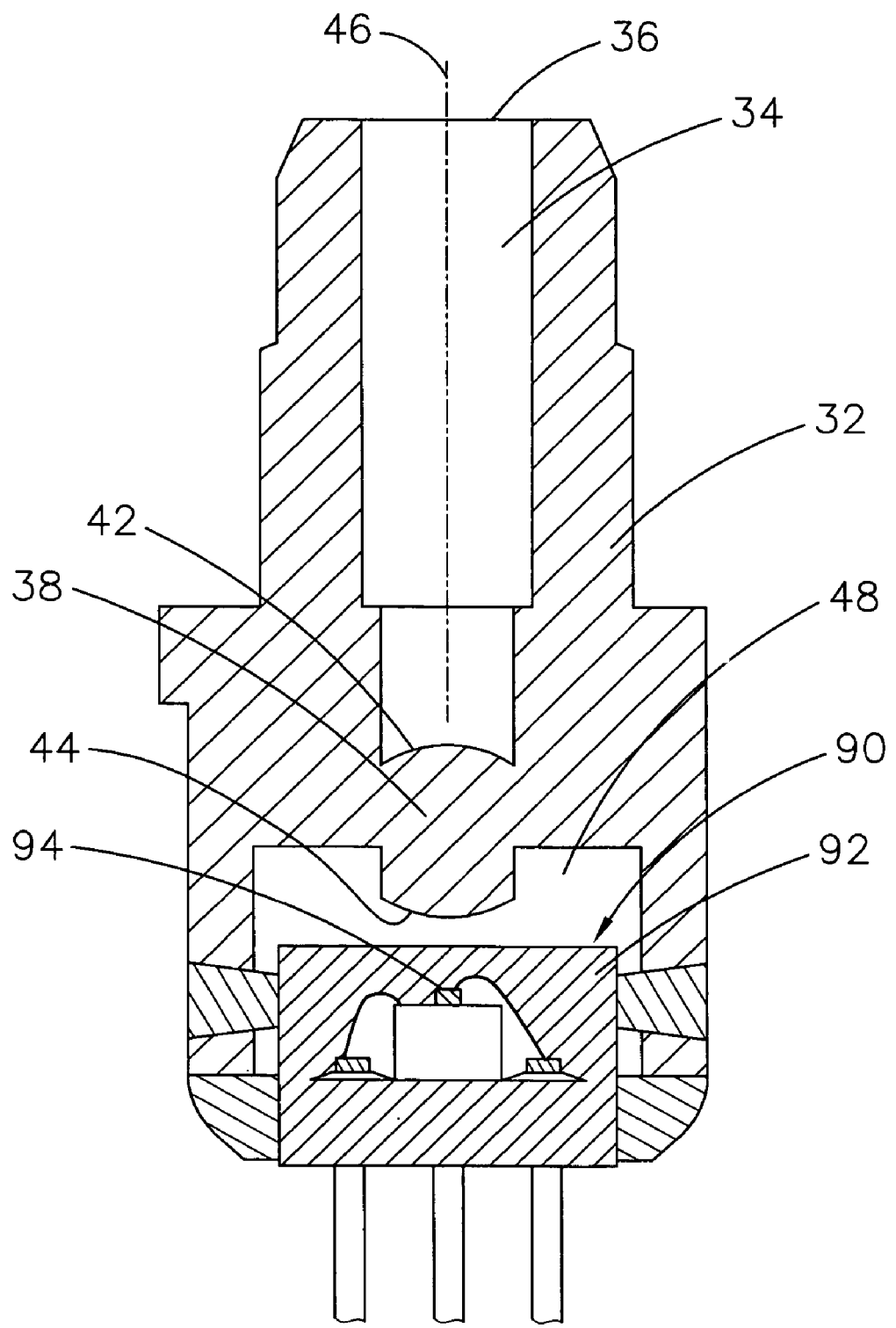
FIG. 7 is a cross sectional view of an optical subassembly in accordance with the present invention.

Referring to FIG. 7, an optical subassembly includes a receptacle 32 and a LED 90. The receptacle 32 is formed with a passage 34, and an optical axis 46 is defined in the passage 34. The passage 34 has an open end 36 and a close end 38. Two opposite lenses 42, 44 are formed on the either side of the close end 38. The two lenses 42, 44 can be along to the optical axis 46. Furthermore, at an end of the receptacle 32 is formed a chamber 48 and the lens 44 is disposed in the chamber 48.

The LED 90 is disposed in the chamber 48 and aligned to the optical axis 46 and its focus. And the LED 90 includes an outer seal 92 interiorly provided with a light-emitting chip 94, wherein the outer seal 92 is made of epoxy resin for hermetically sealing the light-emitting chip 94, such that the LED is a conventional type LED.

Figure 8:
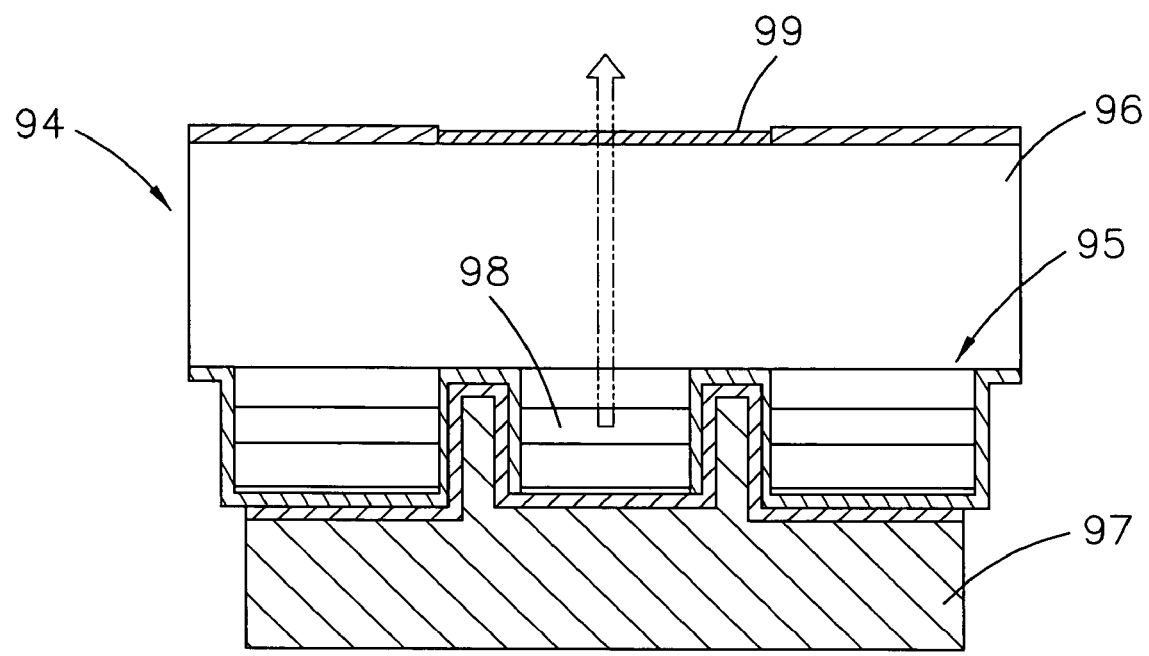
FIG. 8 is a cross sectional view of a light-emitting chip in accordance with the present invention.

Referring to FIG. 8, the light-emitting chip 94 includes an epitaxial portion 95 and a substrate 96, wherein the substrate 96 is disposed at a side of the epitaxial portion 95, and another side of the epitaxial portion 95 is combined with a layer 97 of P-type material. When using a relative thick P-type material layer 97 and adhering it with silver glue or AuSn solder, the short circuit of the light-emitting chip 94 can be prevented during package process, wherein the P-type material layer 97 can be an electroplated metal layer or a wafer-bonded conductive substrate. Furthermore, the epitaxial portion 95 comprises plural epitaxial layers, including a layer of active region 98 that can provide light source.

The surface of the substrate 96 is not specially provided with a micro lens, but formed with a transparent surface 99, such that the light emitted from the active region 98 can pass through the transparent surface 99. The LED that allows the light to pass through the substrate 96 is called Back-side Bottom-emitting Flat LED.

Figure 9:
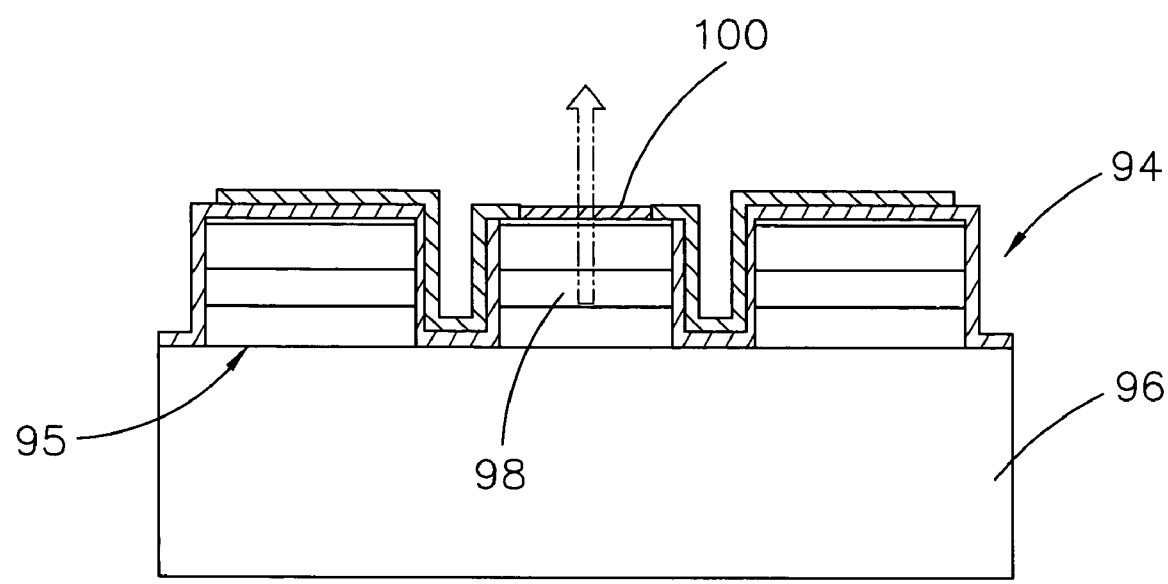
FIG. 9 is another cross sectional view of a light-emitting chip in accordance with the present invention.

Referring to FIG. 9, wherein a light-emitting chip 94 in accordance with another embodiment of the present invention is shown and includes a flat transparent surface 100 formed at a side of the epitaxial layer 95, and the flat transparent surface 100 is located away from the substrate 96. In this case, the light emitted from the active region 98 will pass through the transparent surface 100 at a side of the epitaxial portion 95, but not pass through the substrate 96. The LED that allows the light to pass through the side of the epitaxial portion 95 is called Front-side Top-Emitting Flat LED. Particularly, the light-emitting chip 94 has no micro lens in the direction that the light passes through.

The surface of the neither Front-side Top-emitting Flat LED nor Back-side Bottom-emitting Flat LED is provided with a micro lens, so the production of the light-emitting chip 94 is easy and the cost is low.

Referring to FIG. 7, when the LED 90 is assembled to the receptacle 32, and the light emitted from the LED 90 will be focused twice by the lenses 44 and 42, so as to reduce the coupling loss of the emitting light. By this way, it ensures that enough light will be coupled into a fiber despite the beam divergence angle of a LED is large.

In addition, since light-emitting chip 94 has no micro lens, the light passing through the transparent surface are focused by the lenses 42 and 44, thereby, the possible optical misalignment can be avoided in the fabrication process of the flat LED as well as the ball-lens TO-can package. In other words, the combination of the LED 90 and the receptacle 32 in accordance with the present invention can make alignment easier. On the other hand, the package type of the LED 90 is the same as that of the conventional LED. In addition, the combination of the LED 90 and the receptacle 32 is compatible with the conventional package process. Therefore, the manufacturing processes are pretty easy, mature, cost-effective, and suitable for mass production. Since light-emitting chip 94 has no micro lens, the light-emitting chip 94 has different choices for light emitting directions. As a result, the on-wafer LED testing before package can be carried out on a whole wafer, e.g., Front-side Top-emitting Flat LED.

Figure 10:
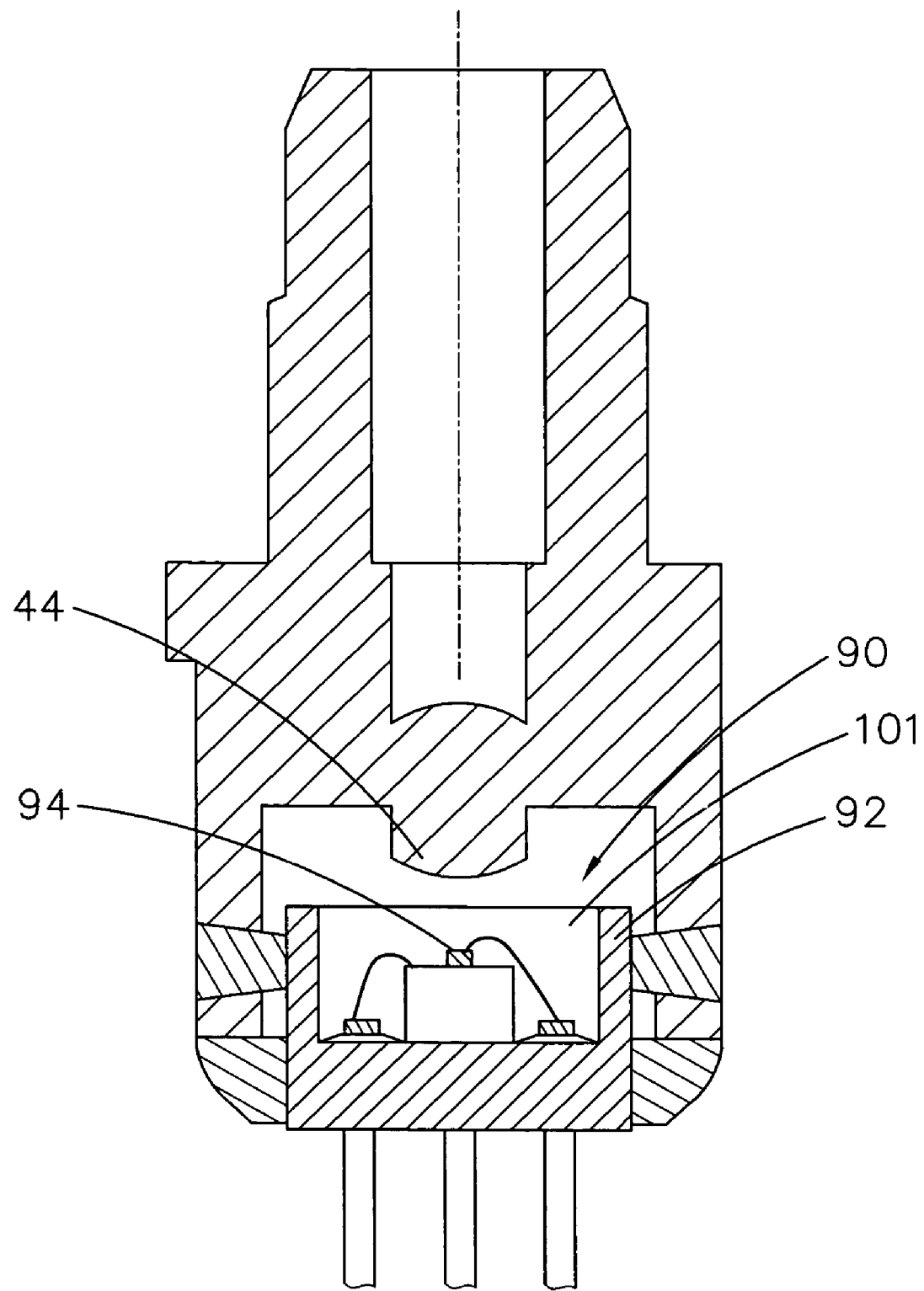
FIG. 10 is a cross sectional view of another optical subassembly in accordance with the present invention.

With reference to FIG. 10, the outer seal 92 is provided at a top surface thereof with an opening 101, and the length of the lens 44 is increased, so as to shorten the distance between the light-emitting chip 94 and the lens 44, and even the lens 44 can enter the opening 101, thus the distance between the light-emitting chip 94 and the lens 44 is further decreased. By such arrangements, most of the light can be projected into the lens 44 despite the beam divergence angle of the LED 90 is large, so as to achieve a good coupling effect.

Figure 11:
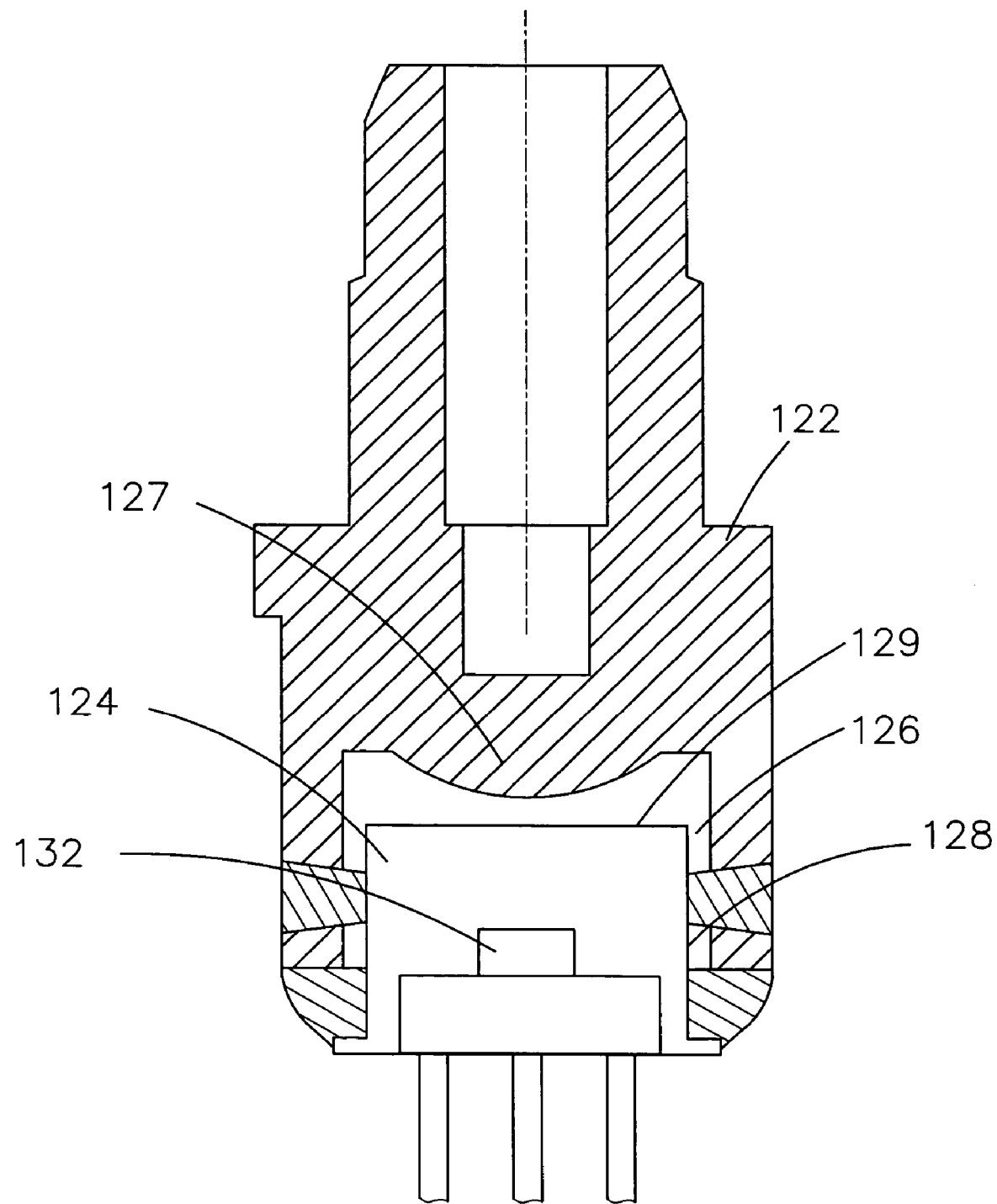
FIG. 11 is a cross sectional view of an optical subassembly for showing a receptacle having a single lens and a light/receiving device having hermetic sealing.

Referring to FIG. 11, an optical subassembly includes a receptacle 122 and a device 124. A chamber 126 and a coupling structure 127 are formed in the receptacle 122. The coupling structure 127 has a single lens and be located in the chamber 126.

The device 124 is a light emitting element or a light receiving element which is assembled in the receptacle 122 and disposed in alignment with the optical axis. The device 124 includes an outer sealing 128 and a chip 132 which is assembled in the outer sealing 128. If the top surface 129 of the device 124 is a sealing surface then the chip 132 is positioned in a hermetic space. The top surface 129 has a transparent portion which may be transparent glass or resin for light passing through.

As show in FIG. 11, the coupling structure 127 is able to close to the device 124 by a large diameter or an extension portion. Therefore more light emitted from the device 124 can be focused by the coupling structure 127 so that the optical subassembly has a good efficiency for light output.

Figure 12:
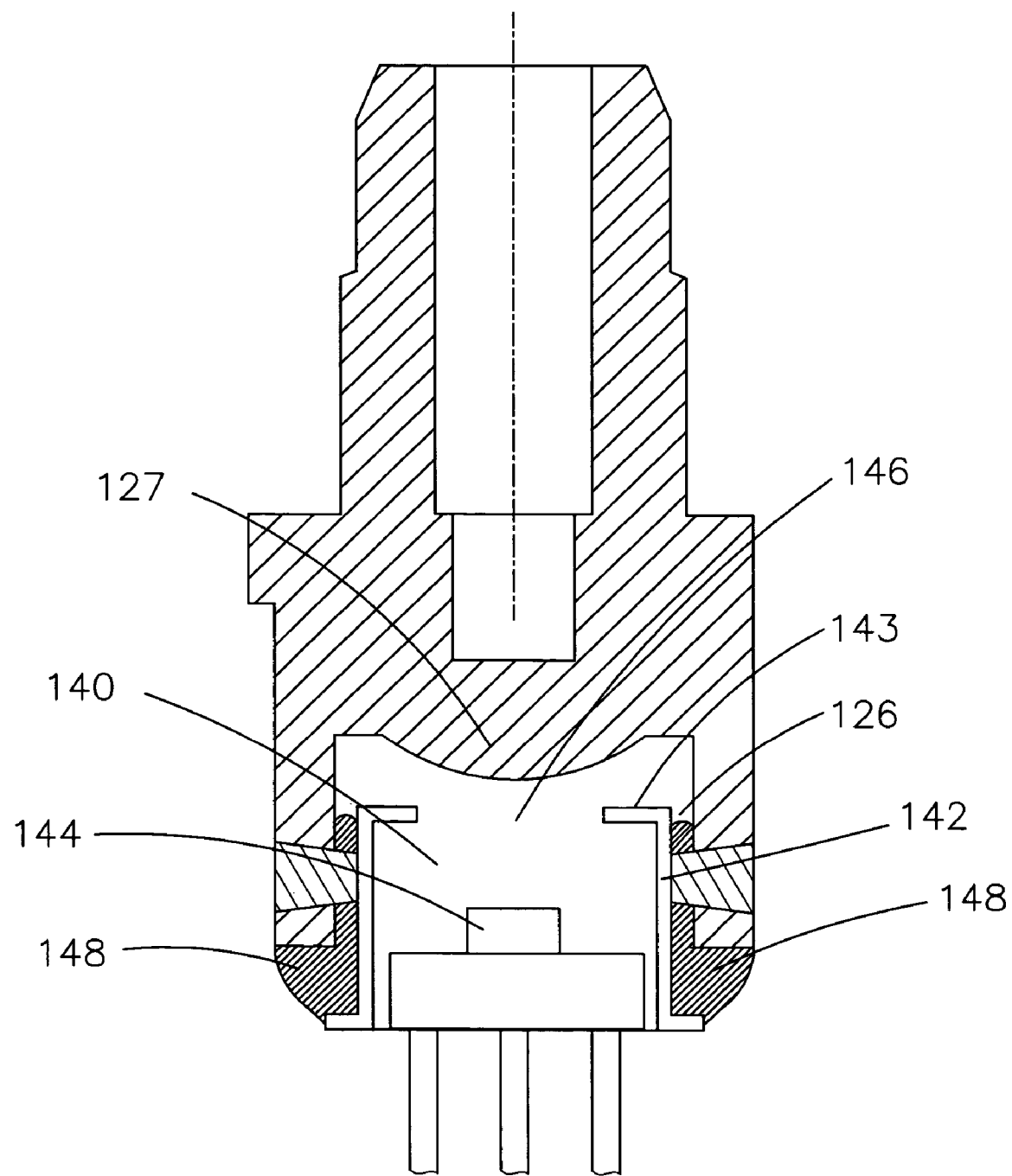
FIG. 12 is a cross sectional view of an optical subassembly for showing a receptacle having a single lens and a light/receiving device having non-hermetic sealing.

As show in FIG. 12, the coupling structure 127 has a single lens and close to a light emitting/receiving device 140. The light emitting/receiving device 140 includes an outer sealing 142 and a chip 144 which is assembled in the outer sealing 142, and the top surface 143 of the outer sealing 142 has an opening 146.

Considering the requirement of the reliability of the chip 144, the chip 144 must be positioned in a hermetic space. However, the outer sealing 142 is non-hermetic sealing so a space between the chamber 126 and the device 140 has to be a hermetic sealing by an adhesive 148. But if the reliability of the chip is not a concern, the space between the chamber 126 and the device 140 can be a non-hermetic space.

Figure 13:
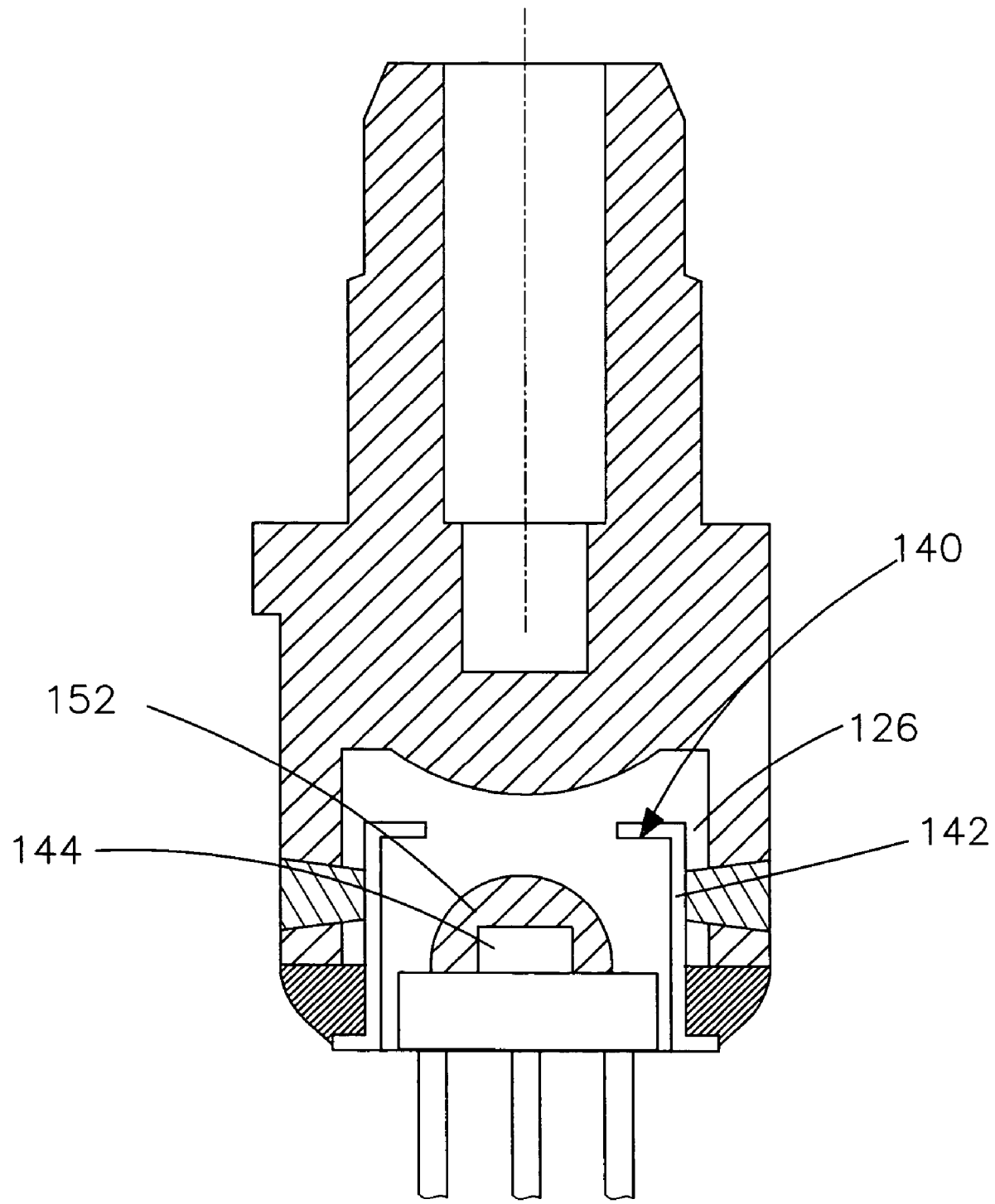
FIG. 13 is a cross sectional view of an optical subassembly for showing a light/receiving device having non-hermetic sealing and a chip having a hermetic sealing package.

As show in FIG. 13, a resin 152 is used to preventing the chip 144 from being contacted with air. In this case, even though the outer sealing 142 having an opening, and the space between the chamber 126 and the device 140 is a non-hermetic space, the reliability of the chip 144 meet the requirement.

Figure 14:
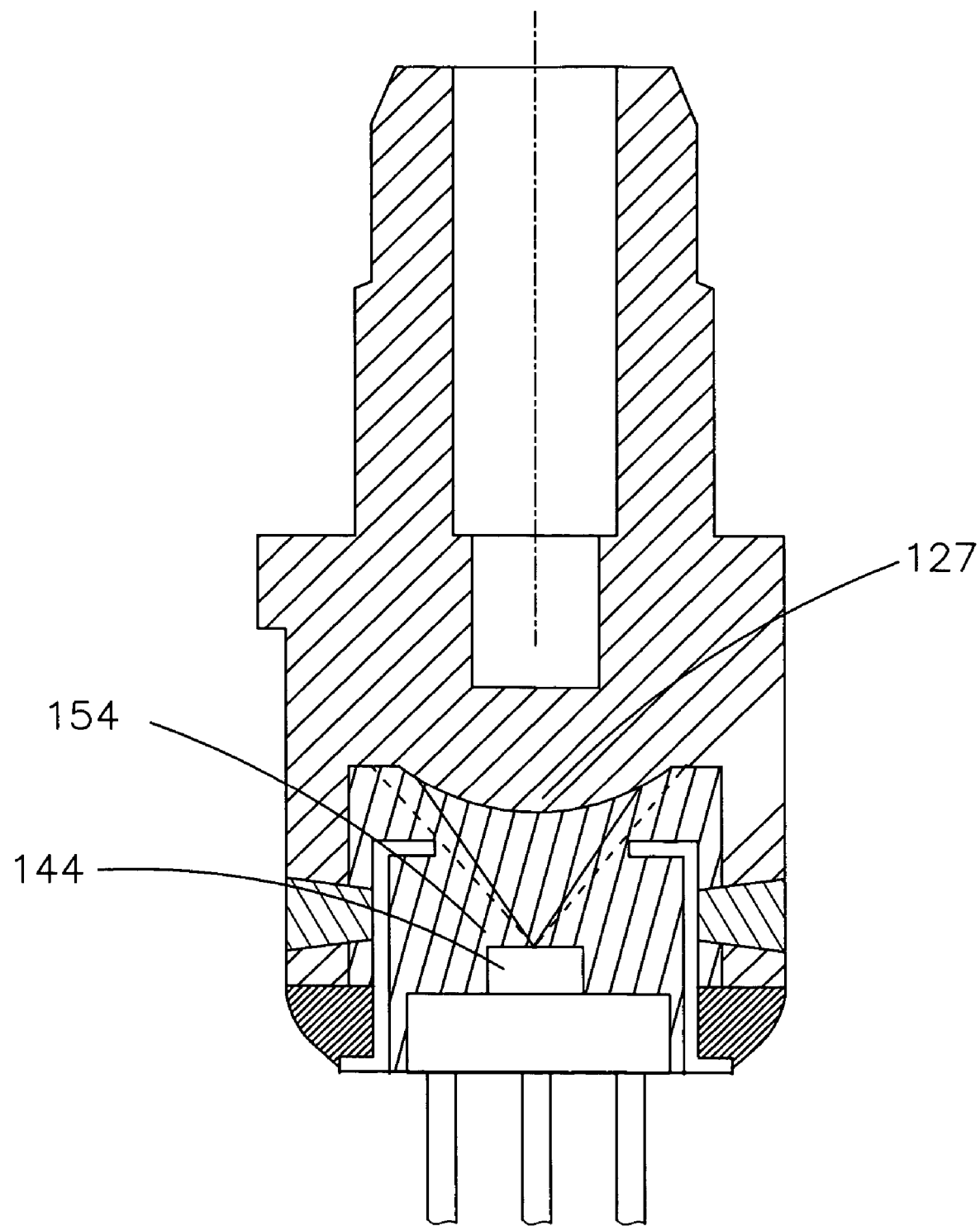
FIG. 14 is a cross sectional view of an optical subassembly in accordance with another embodiment of the present invention.

Referring to FIG. 14, an adhesive 154 is filled between the chip 144 and the coupling structure 127. Preferably, the adhesive 154 is a silicon gel, UV gel, epoxy and the like. Especially, the adhesive 154 is a matching oil whose refractivity is ranged between that of the semiconductor and that of the coupling structure 127. Thus, the refractivity of two different interfaces has a smaller variation to reduce possibility of occurrence of the total internal reflection and to prevent an excessive diffusion of the light. In other words, when the space is initially filled with air, the path of the light emitted from the chip 144 is indicated by the phantom lines, and when the space is filled with the adhesive 154, the path of the light emitted from the chip 144 is indicated by the solid lines. As shown in FIG. 14, the light gathering effect of the optical subassembly is enhanced greatly. For application of the high speed element in the future, the active light receiving region of the photodiode becomes smaller. Thus, the optical subassembly can enhance the light gathering effect so as to increase the light coupling efficiency.

Figure 15:
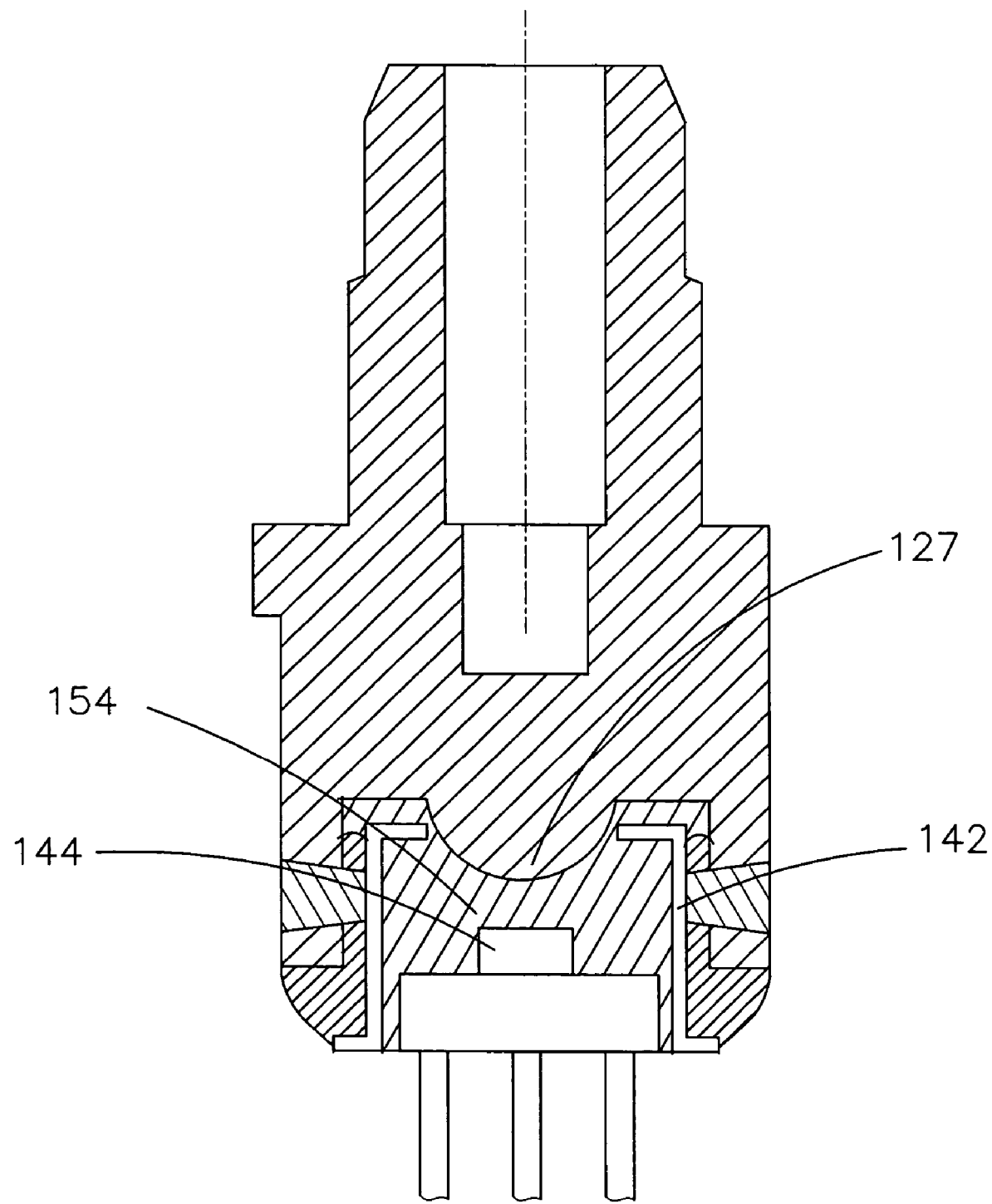
FIG. 15 is a cross sectional view of an optical subassembly in accordance with another embodiment of the present invention.

Referring to FIG. 15, the coupling structure 127 is extended extremely to enter the inside of the outer sealing 142 to approach the chip 144. In addition, the adhesive 154 or the matching oil is filled between the chip 144 and the coupling structure 127.

Thus, the adhesive 154 or the matching oil is filled between the chip 144 and the coupling structure 127 to reduce the diffusion angle of the light so as to enhance the light coupling efficiency and to protect the chip 144.

Based on the above-mentioned embodiments, the structural features and functions of the present invention are concluded as follows:

1) the outer seal of any light emitting devices in accordance with the present invention is defined with an open aperture at an end thereof, and the aperture is aligned with the light emitting chip in the outer seal, such that a lens in the receptacle can be located closely to the light emitting chip, thus the output power is improved.

2) Any light emitting devices in accordance with the present invention are conventional, and the difference is that the outer seal in accordance with the present invention is not equipped with a hermetic sealing cover structure, and thus the cost of the light emitting device can be reduced.

3) The specification of the optical subassembly in accordance with the present invention is identical to that of a conventional optical subassembly. The production processes and equipments used for the receptacle and light emitting device will not be changed. In other words, the structure of the optical subassembly in accordance with the present invention is compatible with the conventional manufacturing infrastructure.

4) The receptacle in accordance with the present invention can be provided with two opposite lenses. In this case, light signals can be guided into an optical fiber more efficiently, allowing a larger error occurred in light coupling. Thereby, the production can be easier.

5) The LED in accordance with the present invention is not provided with a micro lens, and the receptacle assembled with the LED is provided with two opposite lenses. In this case, despite the light emitted from the LED has a large divergence angle, the present invention can achieve a desired coupling effect.

6) The LED in accordance with the present invention is not provided with a micro lens, thereby the LED structure is simple and low cost.

7) The package type of the LED is the same as that of the conventional LED, so the sealing of the LED is pretty easy and the package process of the combination of the LED and the receptacle is compatible with the conventional package process;

8) The LED in accordance with the present invention is not provided with a micro lens, the LED allows different light-emitting choices, such that the on-wafer testing of the light-emitting chip can be performed on a whole wafer;

While we have shown and described various embodiments in accordance with the present invention, it should be clear to those skilled in the art that further embodiments may be made without departing from the scope of the present invention.

What is claimed is:

1. An optical subassembly comprising:
a receptacle having an optical axis and a chamber;
a coupling structure formed in a direction of the optical axis, the coupling structure and the receptacle forming a single unit, the coupling structure having a dual-lens having two lenses, and one of the lenses of the dual-lens of the coupling structure being disposed in the chamber;
a light emitting device assembled in the chamber of the receptacle and disposed in alignment with the optical axis, the light emitting device including an outer seal and a light emitting chip disposed in the outer seal, a transparent surface being defined on a surface of the light emitting chip, the transparent surface being a flat structure without having a micro lens;
an open aperture formed in a surface of the outer seal of the light emitting device and located opposite to the transparent surface of the light emitting chip;
an air gap formed between an outer surface of the outer seal of the light emitting device and an inner surface of the chamber;
at least two temporally fixings disposed in the air gap to connect the chamber of the receptacle and the outer seal of the light emitting device;
an adhesive filled with the air gap and stayed on a periphery of the outer seal;
a light path located between the light emitting chip and the coupling structure;

wherein a plurality of light beams emitted from the light emitting chip can pass through the transparent surface to travel in the light path without producing refraction.

2. The optical subassembly as claimed in claim 1, wherein the outer seal of the light emitting device is made of metal, and the open aperture is formed in an end of the outer seal and located opposite to the light emitting chip.

3. The optical subassembly as claimed in claim 1, wherein the outer seal of the light emitting device is made of epoxy resin, and the open aperture is formed in an end of the outer seal and located opposite to the light emitting chip.

4. The optical subassembly as claimed in claim 1, wherein one of the lenses of the dual-lens of the coupling structure is made close to the light emitting chip.

5. The optical subassembly as claimed in claim 1, wherein one of the lenses of the dual-lens of the coupling structure extends into the outer seal to approach the light emitting chip.

6. The optical subassembly as claimed in claim 1 wherein the light-emitting chip of the light emitting device is an LED chip, the light emitting chip at least includes a substrate and an epitaxial portion, the transparent surface is formed on the substrate, and the light beams emitted from the light emitting chip can pass through the transparent surface without producing refraction by any micro lens.

7. The optical subassembly as claimed in claim 1, wherein the light-emitting chip of the light emitting device is an LED chip, the light emitting chip at least includes a substrate and an epitaxial portion, and the transparent portion is formed at a side of the epitaxial portion, and the light beams emitted from the light emitting chip can pass through the transparent surface without producing refraction by any micro lens.

8. An optical subassembly comprising:
a receptacle including an optical axis and a chamber;
a coupling structure formed in a direction of the optical axis, the coupling structure having a single lens disposed in the chamber, the coupling structure and the receptacle forming a single unit;
a device assembled to the chamber of the receptacle and disposed in alignment with the optical axis;
wherein the device is a light emitting/receiving device and the single lens is closed to the device by a large diameter;
the device including an outer seal and a light emitting chip assembled in the outer seal, an opening is formed in the outer seal and opposite to the light emitting chip, a transparent surface is defined on a surface of the light emitting chip without forming a micro lens, a plurality of light beams emitted from the light emitting chip can pass through the transparent surface without passing any micro lens and the opening of the outer seal to the coupling structure, and the light beams between the light emitting chip and the coupling structure are not refracted.

9. The optical subassembly as claimed in claim 8, wherein the device is a photo detector.

10. The optical subassembly as claimed in claim 8, wherein an air gap is formed between an outer surface of the outer seal and an inner surface of the chamber, an adhesive is filled with the air gap so that the light emitting device is hermetically assembled to the receptacle, so as to enable the light emitting chip to be received in a hermetically sealed space.

11. An optical subassembly comprising:
a receptacle including an optical axis and a chamber;
a coupling structure formed in a direction of the optical axis, the coupling structure having a single lens disposed in the chamber, the coupling structure and the receptacle forming a single unit;
a light emitting/receiving device assembled to the chamber of the receptacle and disposed in alignment with the optical axis, wherein the light emitting/receiving device includes an outer seal and a light emitting chip assembled in the outer seal, an opening being formed in the outer seal and opposite to the light emitting chip, the light emitting chip mounted in the outer seal and disposed in alignment with the opening and the coupling structure;
a space formed between the lens and the light emitting chip;
a medium filled with the space and having a refractivity ranged between that of the light emitting chip and that of the coupling structure;
wherein a plurality of light beams emitted from the light emitting chip can travel in the medium to reduce an angle of diffusion, and the medium is filled with the space to prevent the light beams from producing refraction during travel.

12. The optical subassembly as claimed in claim 11, wherein the coupling structure extends into the outer seal of the light emitting/receiving device to approach the light emitting chip, and the medium is filled between the light emitting chip and the coupling structure.

13. The optical subassembly as claimed in claim 11, wherein the medium is an adhesive, silicon gel or matching oil.

14. The optical subassembly as claimed in claim 11, wherein the light emitting chip has a side formed with a transparent surface, and the transparent surface is a flat structure without having a micro lens.

* * * * *